(12) United States Patent
Ito (10) Patent No.: US 11,555,980 B2
(45) Date of Patent: Jan. 17, 2023

(54) LENS BARREL AND CAMERA INCLUDING THE LENS BARREL

(71) Applicant: Panasonic Intellectual Property Management Co., Ltd., Osaka (JP)

(72) Inventor: Daisuke Ito, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 54 days.

(21) Appl. No.: 16/920,691

(22) Filed: Jul. 4, 2020

(65) Prior Publication Data

US 2021/0072490 A1 Mar. 11, 2021

(30) Foreign Application Priority Data

Sep. 10, 2019 (JP) .............................. JP2019-164550

(51) Int. Cl.
| | |
|---|---|
| *G02B 7/02* | (2021.01) |
| *G02B 7/04* | (2021.01) |
| *G02B 13/00* | (2006.01) |
| *G03B 17/14* | (2021.01) |

(52) U.S. Cl.
CPC .............. *G02B 7/04* (2013.01); *G02B 7/021* (2013.01); *G02B 13/001* (2013.01); *G03B 17/14* (2013.01)

(58) Field of Classification Search
CPC ........ G02B 7/04; G02B 13/001; G02B 7/021; G03B 17/14; G03B 2205/0046; G03B 2205/0084
USPC .................................................. 359/819–830
See application file for complete search history.

(56) References Cited

U.S. PATENT DOCUMENTS

| 6,069,745 | A | * | 5/2000 | Fujii | ..................... G02B 7/102 359/694 |
| 2008/0106788 | A1 | * | 5/2008 | Yasutomi | ............... G02B 7/102 359/432 |
| 2017/0139180 | A1 | * | 5/2017 | Fujinaka | .............. G02B 27/646 |

FOREIGN PATENT DOCUMENTS

| JP | H08-248289 A | 9/1996 |
| JP | 2002-244013 A | 8/2002 |
| JP | 2012-053141 A | 3/2012 |

* cited by examiner

*Primary Examiner* — Mahidere S Sahle
(74) *Attorney, Agent, or Firm* — Renner, Otto, Boisselle & Sklar, LLP (57) ABSTRACT

A lens barrel having one end and the other end includes: a first frame that is movable and holds optical members; a second frame that is arranged to be relatively movable toward the other end with respect to the first frame, and holds optical members; and a third frame that is mounted on the first frame so as to be movable, and holds an optical member. The first frame includes a first stopper portion that comes into contact with the third frame to limit movement toward the one end. The first frame includes a second stopper portion that comes into contact with, when the first frame is most distant from the second frame, the third frame to limit movement toward the other end. The second frame includes a third stopper portion that has a contact surface located close to the one end with respect to the second stopper portion, and that comes into contact with, when the second frame is located within a range on the optical axis where the third frame is movable, the third frame to limit movement toward the other end.

7 Claims, 13 Drawing Sheets

Fig.7D ers or repeated descriptions of substantially the same con-
LENS BARREL AND CAMERA INCLUDING THE LENS BARREL

BACKGROUND OF THE INVENTION

Field of the Invention

The present disclosure relates to a lens barrel and a camera including the lens barrel.

Description of the Related Art

JP H8-248289 A discloses a lens barrel that is used by being attached to a camera. In the lens barrel, optical members arranged such that their optical axes are located on the same straight line, such as a plurality of lenses, are arranged. Some of the optical members are held by a frame that is movable in the optical axis direction. The movable frame is moved in the optical axis direction by a motor or the like. A stopper that limits the stroke range of the frame is provided in the lens barrel such that the optical members held by the frame do not collide with another optical member adjacent on the optical axis.

SUMMARY OF THE INVENTION

In designing a lens barrel having desired optical characteristics, the degree of freedom in the design further decreases, as the lens barrel is made smaller in size.

Therefore, an object of the present disclosure is to ensure a degree of freedom in designing a lens barrel, even if the lens barrel is downsized.

According to one aspect of the present disclosure, a lens barrel having one end and another end is provided, the lens barrel including:

a first frame that is movable in an optical axis direction of the lens barrel, and holds an optical member;

a second frame that is arranged to be relatively movable toward the other end with respect to the first frame, and that holds an optical member; and a third frame that is mounted on the first frame so as to be movable in the optical axis direction, and that holds an optical member, in which:

the first frame includes a first stopper portion that comes into contact with the third frame to limit movement toward the one end;

the first frame includes a second stopper portion that comes into contact with, when most distant from the second frame, the third frame to limit movement toward the other end; and the second frame includes a third stopper portion that has a contact surface located close to the one end with respect to the second stopper portion, and that comes into contact with, when the second frame is located within a range on the optical axis where the third frame is movable, the third frame to limit movement toward the other end.

According to another aspect of the present disclosure, a camera having the above lens barrel is provided.

According to the present disclosure, a degree of freedom in designing a lens barrel can be ensured, even if the lens barrel is downsized.

DETAILED DESCRIPTION OF THE INVENTION

Hereinafter, embodiments will be described in detail with reference to the drawings as appropriate. However, more detailed description than necessary may be omitted. For example, detailed descriptions of already well-known matters or repeated descriptions of substantially the same configurations may be omitted. This is to avoid the following description from becoming unnecessarily redundant and to facilitate understanding by those skilled in the art.

The inventor(s) provides the accompanying drawings and the following description in order for those skilled in the art to fully understand the present disclosure, which are not intended to limit the claimed subject matters.

Hereinafter, a lens barrel according to one embodiment of the present disclosure will be described with reference to the drawings.

Figure 1:
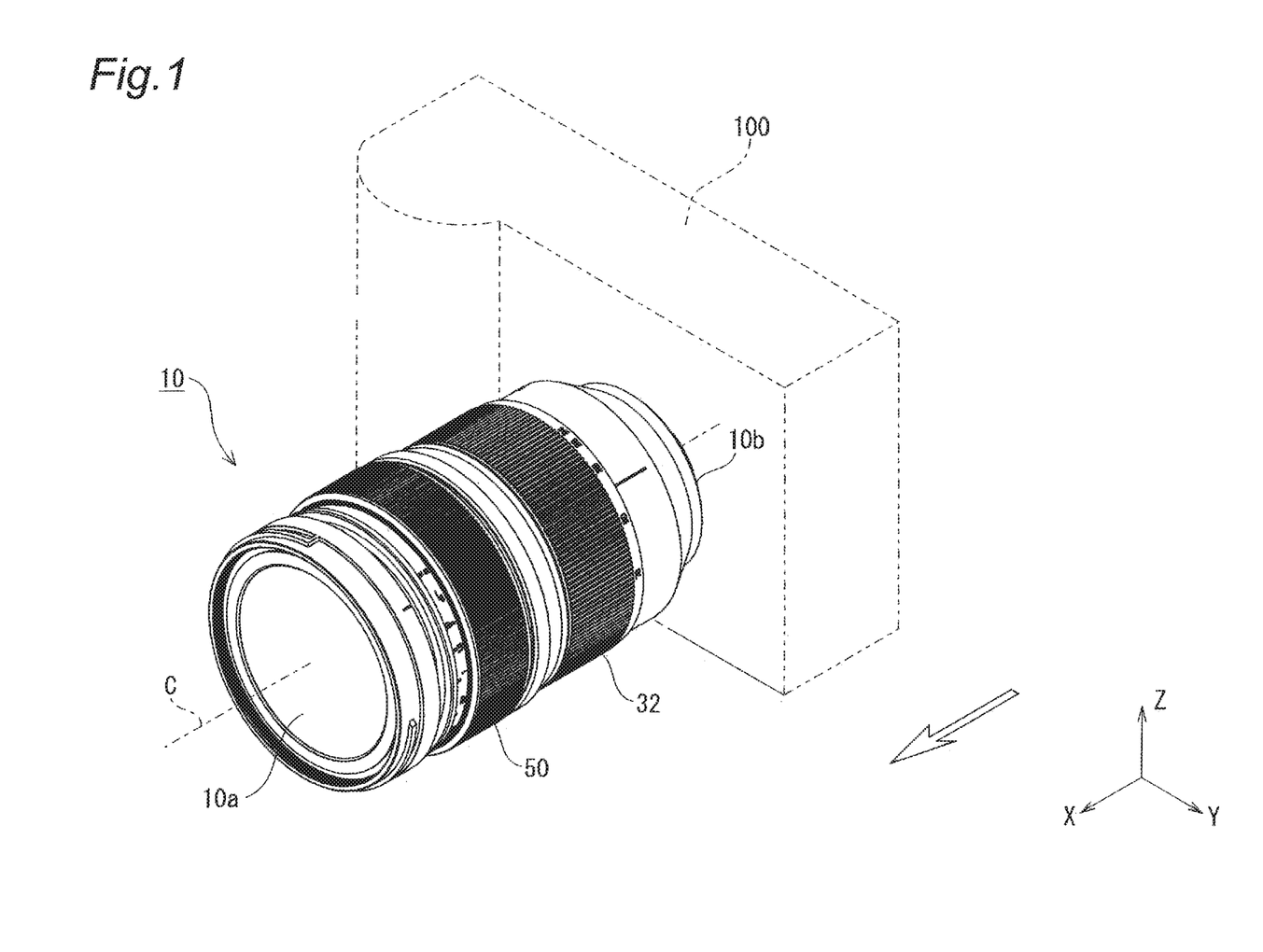
FIG. 1 is a schematic perspective view of a camera including a lens barrel according to one embodiment of the present disclosure.
Figure 2:
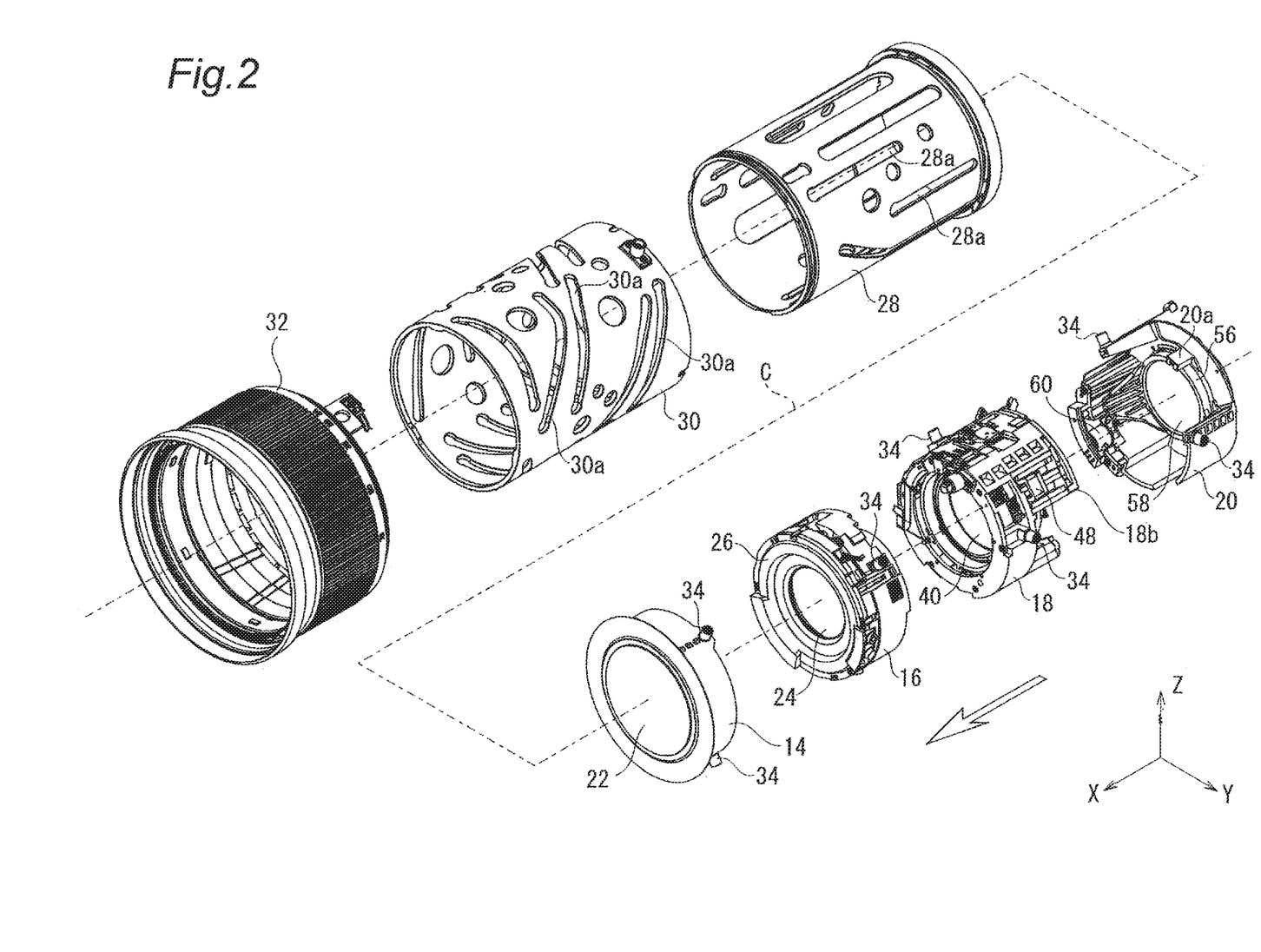
FIG. 2 is an exploded perspective view of a part of the lens barrel.

FIG. 1 is a schematic perspective view of a camera including a lens barrel according to one embodiment of the present disclosure. FIG. 2 is an exploded perspective view of a part of the lens barrel. In the views, an X-Y-Z coordinate system is illustrated for easy understanding. The X-axis direction is an extending direction of the optical axis of the lens barrel. In the views, the white arrow indicates a direction in which a subject exists.

A lens barrel 10 illustrated in FIG. 1 is one that is used by being replaceably or non-detachably attached to a camera 100, and is particularly configured to be capable of taking telephoto pictures and wide-angle pictures. The lens barrel 10 includes one end 10a and another end 10b. In the case of the present embodiment, the one end 10a is an end on a subject side, and the other end 10b is an end on an image plane side. In the lens barrel 10, a plurality of optical members arranged such that their optical axes are matched on an optical axis C of the lens barrel 10, such as lenses, are arranged.

In the lens barrel 10, a plurality of frames 14, 16, 18, and 20 that respectively hold the optical members such as lenses are housed to be movable in the extending direction of the optical axis C of the lens barrel 10 (optical axis direction), as illustrated in FIG. 2. For example, the frame 14 holds a lens 22 as the optical member. For example, the frame 16 holds a lens 24 and an aperture unit 26 as the optical members. The components illustrated in FIG. 2 are ones related to an embodiment of the present disclosure, and the lens barrel 10 includes other components.

Each of the plurality of frames 14, 16, 18, and 20 is housed in the lens barrel 10 so as to be movable in the extending direction of the optical axis C of the lens barrel 10 (X-axis direction). Specifically, the plurality of frames 14, 16, 18, and 20 are housed in a cylindrical fixed cam 28. In the fixed cam 28, a plurality of substantially linear cam grooves 28a, extending in the extending direction of the optical axis C, are formed. The fixed cam 28 is housed in a cylindrical movable cam 30. Also, in the movable cam 30, a plurality of substantially curved cam grooves 30a, extending in the circumferential direction of the optical axis C while extending in the extending direction of the optical axis C, are formed. The movable cam 30 is connected to a zoom ring 32 that constitutes a part of the outer shell of the lens barrel 10.

Cam followers 34 that engage with the cam grooves 28a of the fixed cam 28 and the cam grooves 30a of the movable cam 30 are provided in the plurality of frames 14, 16, 18, and 20, respectively. By rotating the zoom ring 32, the movable cam 30 rotates about the optical axis C of the lens barrel 10. Thereby, the cam followers 34 move in accordance with the cam grooves 28a of the fixed cam 28 and the cam grooves 30a of the movable cam 30. As a result, the distances between the frames are changed while the plurality of frames 14, 16, 18, and 20 are moving in the extending direction of the optical axis C.

Figure 3A:
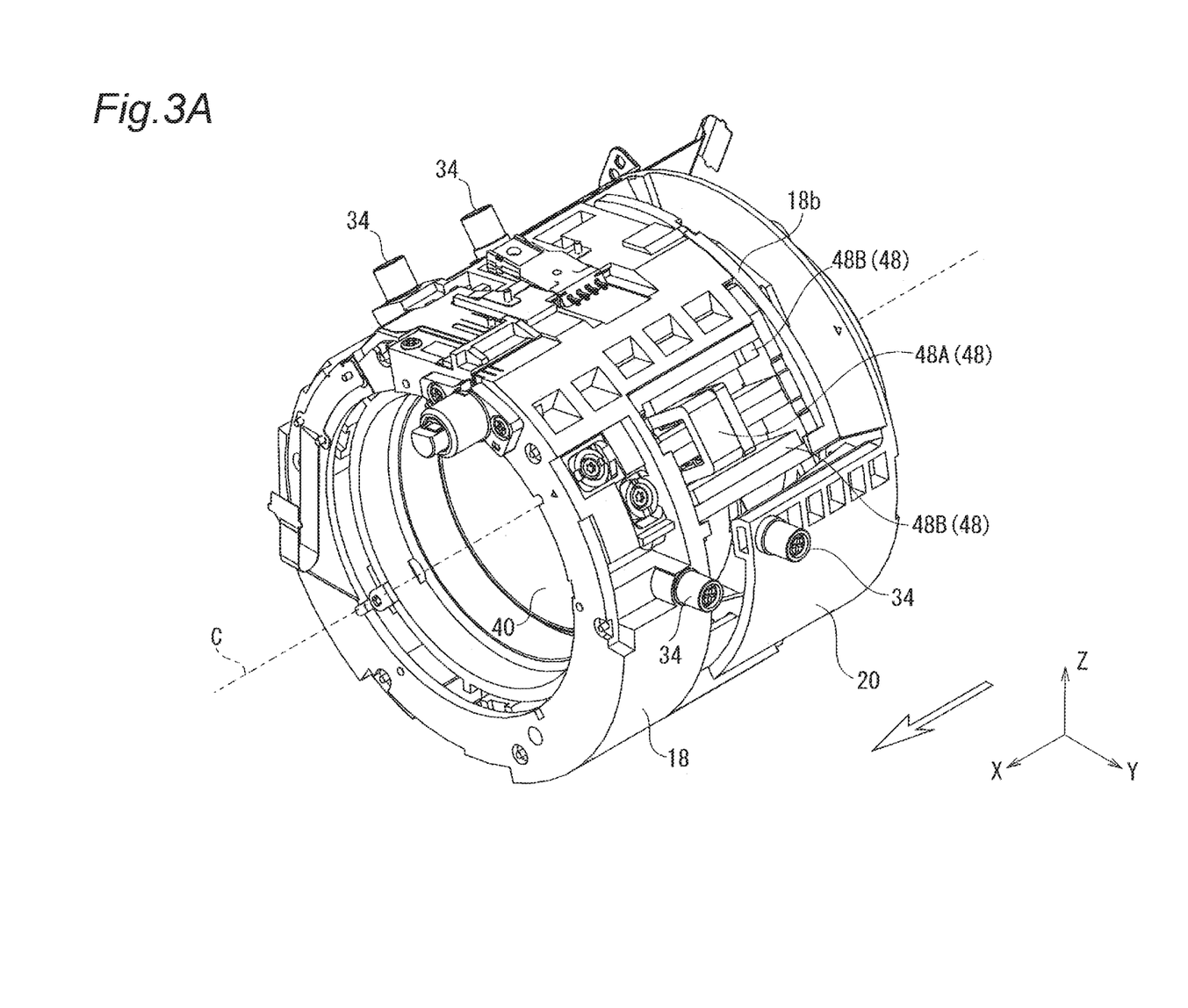
FIG. 3A is a perspective view illustrating first and second frames in a state in which they are most distant from each other.
Figure 3B:
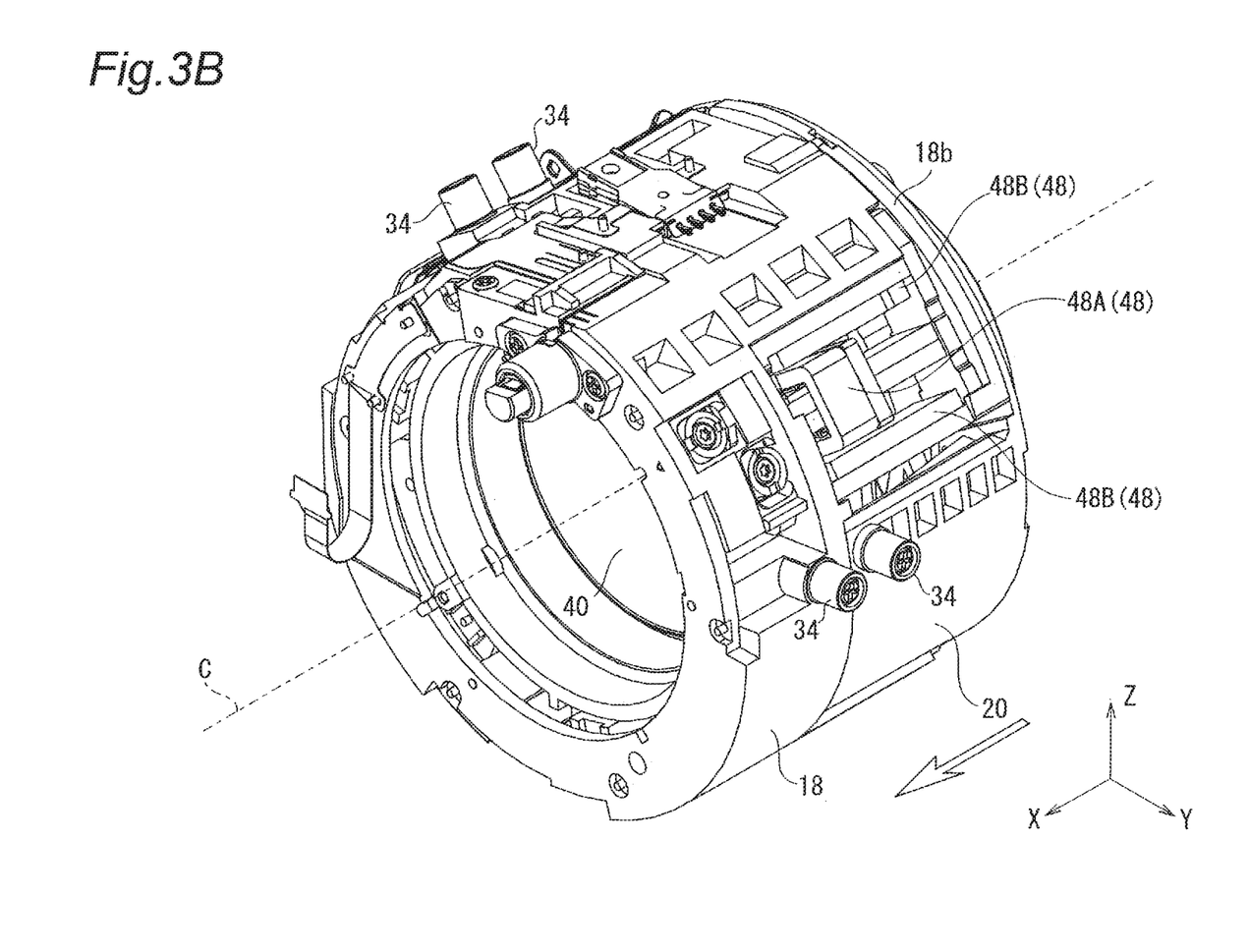
FIG. 3B is a perspective view illustrating the first and second frames in a state in which they are closest to each other.
Figure 4:
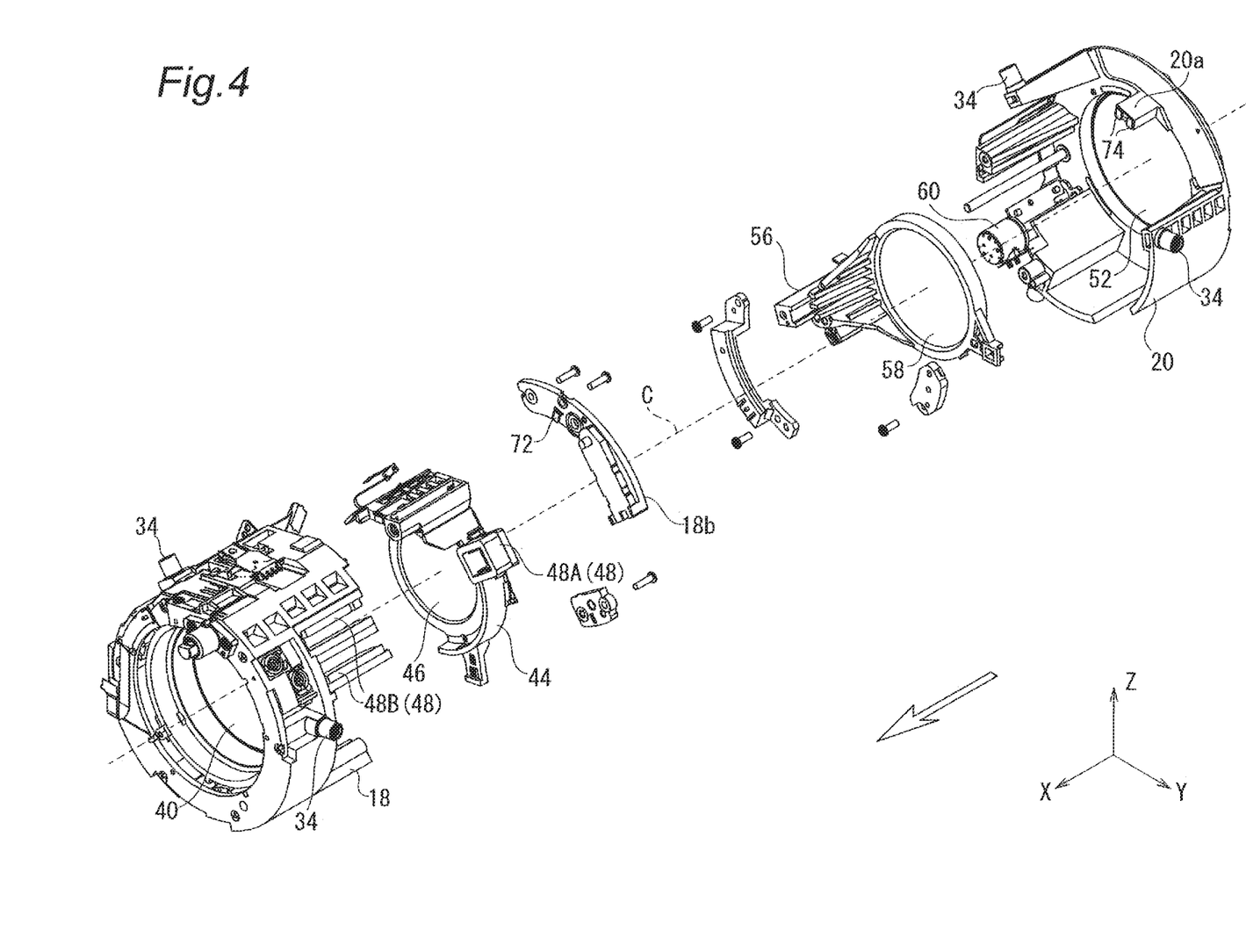
FIG. 4 is an exploded perspective view of the first and second frames.

FIG. 3A is a perspective view illustrating the first and second frames in a state in which they are most distant from each other. FIG. 3B is a perspective view illustrating the first and second frames in a state in which they are closest to each other. FIG. 4 is an exploded perspective view of the first and second frames.

As illustrated in FIGS. 3A and 3B, the frame 18 (hereinafter referred to as a "first frame") and the frame 20 (hereinafter referred to as a "second frame") move close to each other or away from each other in the extending direction of the optical axis C (X-axis direction) due to the rotation of the movable cam 30 as described above. Specifically, when a wide-angle picture is taken, the first frame 18 and the second frame 20 move close to each other, and when a telephoto picture is taken, they move away from each other.

In the case of the present embodiment, the first frame 18 and the second frame 20 partially overlap each other in the directions (Y-axis direction and Z-axis direction) perpendicular to the optical axis C of the lens barrel 10. Therefore, the state in which the first frame 18 and the second frame 20 are most distant from each other occurs when the distance between the end close to the one end 10a of the lens barrel 10 in the first frame 18 and the end close to the other end 10b in the second frame 20 is maximum. On the other hand, the state in which the first frame 18 and the second frame 20 are closest to each other occurs when the distance is minimum.

As illustrated in FIG. 4, the first frame 18 holds a lens 40 and a lens 42 (see FIG. 7A) as the optical members, and has a third frame 44 mounted thereon. In the case of the present embodiment, the third frame 44 holds a focus lens 46 as the optical member.

Figure 5A:
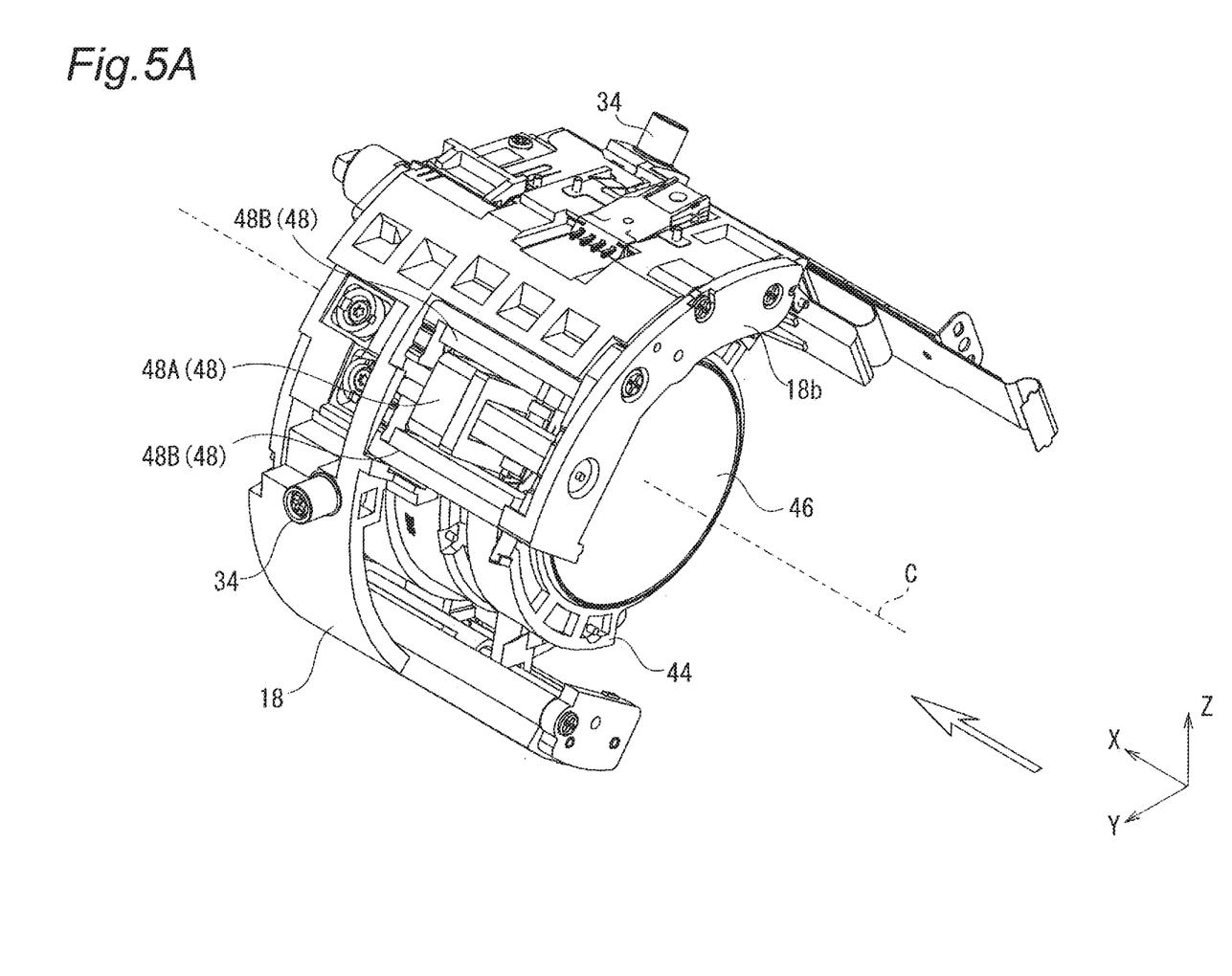
FIG. 5A is a perspective view illustrating a state in which a third frame is located closest to one end of the lens barrel in the first frame.
Figure 5B:
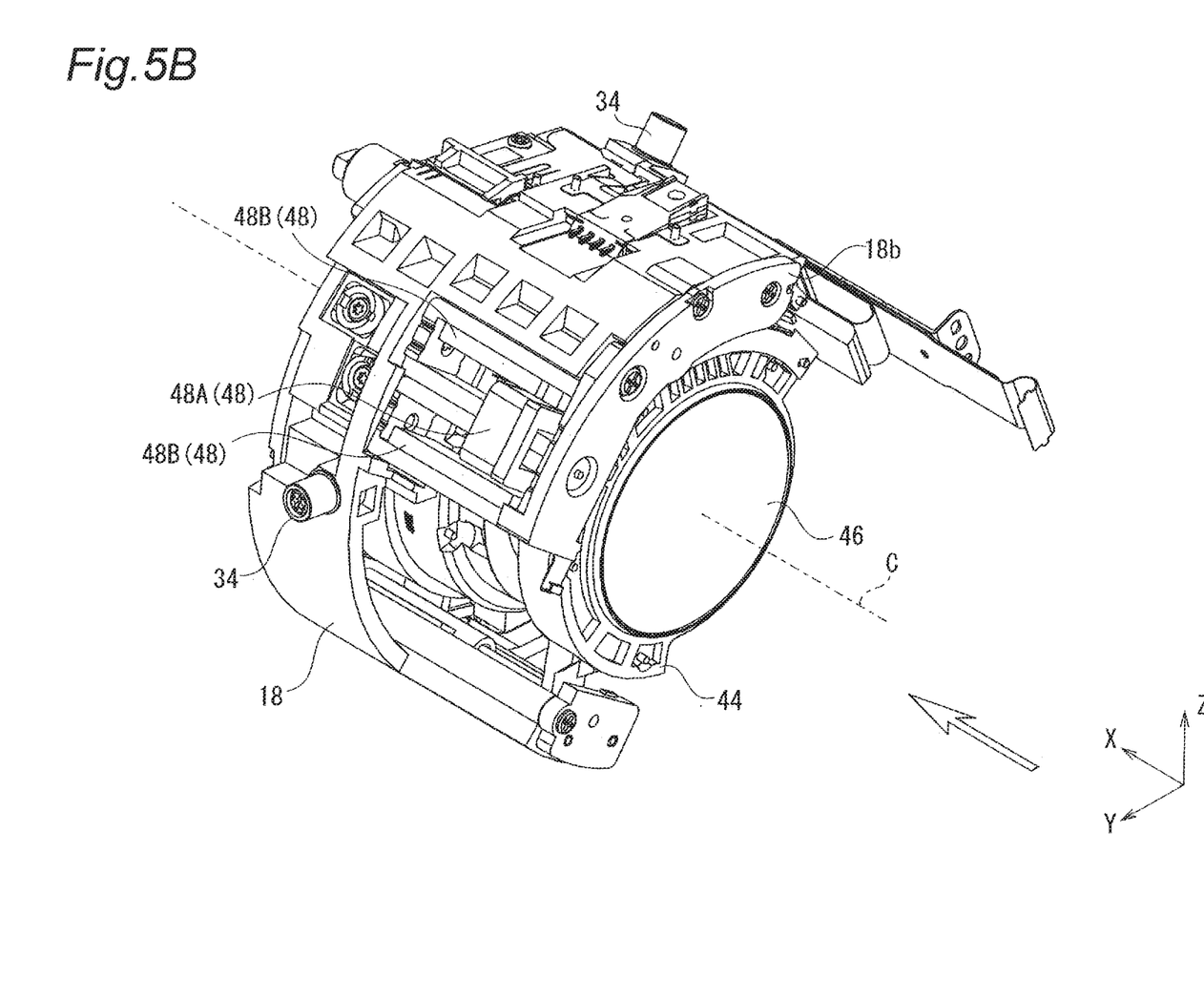
FIG. 5B is a perspective view illustrating a state in which the third frame is located closest to the other end of the lens barrel in the first frame.

FIG. 5A is a perspective view illustrating a state in which the third frame is located closest to the one end of the lens barrel in the first frame. FIG. 5B is a perspective view illustrating a state in which the third frame is located closest to the other end of the lens barrel in the first frame.

As illustrated in FIGS. 5A and 5B, the third frame 44 is mounted on the first frame 18 so as to be movable in the extending direction of the optical axis C of the lens barrel 10 (X-axis direction). In the present embodiment, a linear motor 48 that linearly drives the third frame 44 in the extending direction of the optical axis C is mounted on the first frame 18. A coil 48A, a mover of the linear motor 48, is provided in the third frame 44, and a magnet 48B, a stator, is provided in the first frame 18. When driven by the linear motor 48, the third frame 44 is positioned (fixed) at a desired position with respect to the first frame 18, that is, the focus lens 46 is positioned at a desired position. As an operation device for operating the linear motor 48, the lens barrel 10 includes a focus ring 50, as illustrated in FIG. 1.

As illustrated in FIG. 4, the second frame 20 is arranged close to the other end 10b of the lens barrel 10 with respect to the first frame 18. The second frame 20 holds lenses 52 and 54 (see FIG. 7A) as the optical members. In the case of the present embodiment, the second frame 20 further has a fourth frame 56 mounted thereon. In the case of the present embodiment, the fourth frame 56 holds a focus lens 58 as the optical member.

Figure 6A:
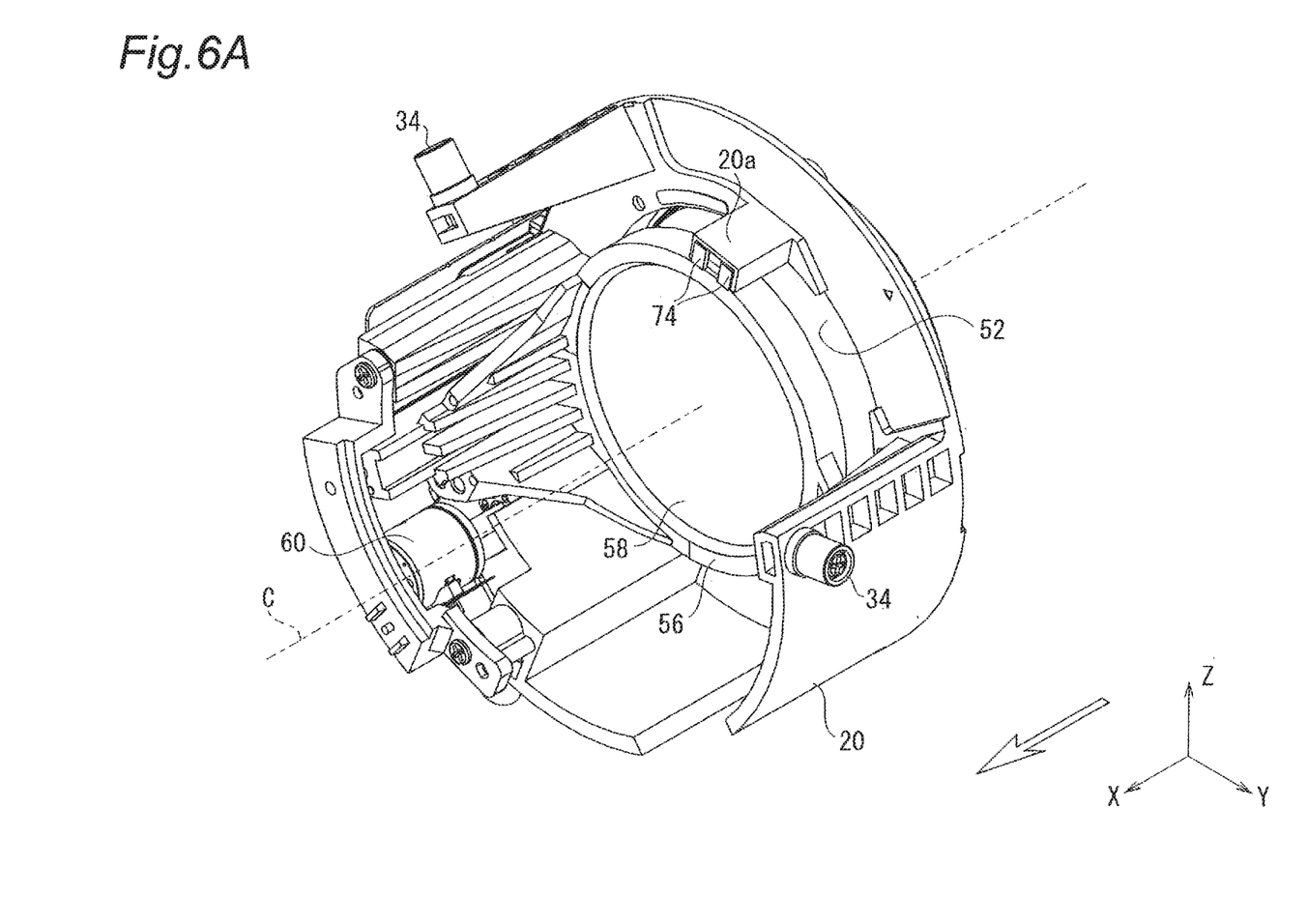
FIG. 6A is a perspective view illustrating a state in which a fourth frame is located closest to the one end of the lens barrel in the second frame.
Figure 6B:
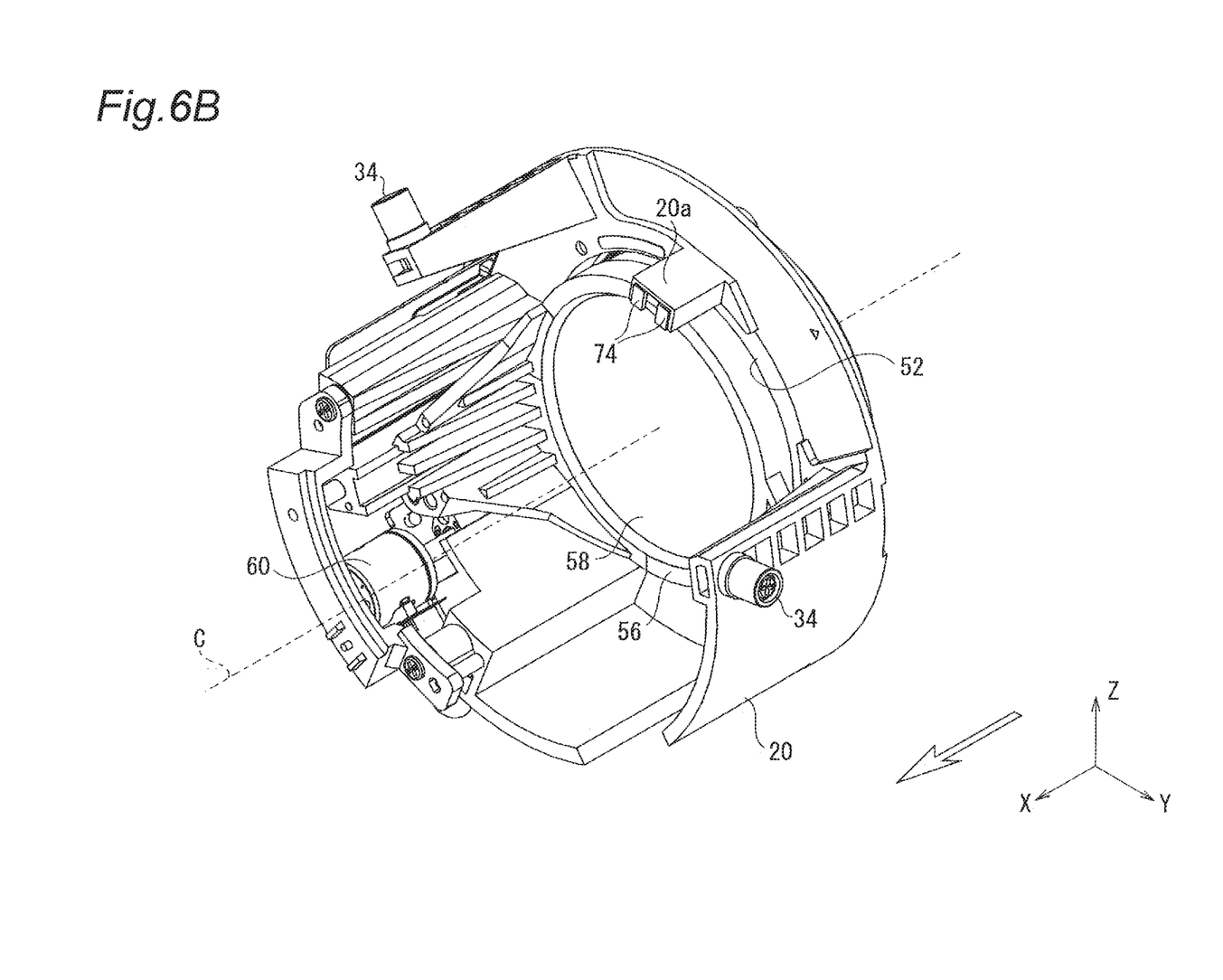
FIG. 6B is a perspective view illustrating a state in which the fourth frame is located closest to the other end of the lens barrel in the second frame.

FIG. 6A is a perspective view illustrating a state in which the fourth frame is located closest to the one end of the lens barrel in the second frame. FIG. 6B is a perspective view illustrating a state in which the fourth frame is located closest to the other end of the lens barrel in the second frame.

As illustrated in FIGS. 6A and 6B, the fourth frame 56 is mounted on the frame 20 so as to be movable in the extending direction of the optical axis C of the lens barrel 10 (X-axis direction). In the case of the present embodiment, a stepping motor 60 that drives the fourth frame 56 in the extending direction of the optical axis C is mounted on the second frame 20. When driven by the stepping motor 60, the fourth frame 56 is positioned (fixed) at a desired position with respect to the second frame 20, that is, the focus lens 58 is positioned at a desired position. The stepping motor 60 is also operated by the focus ring 50 illustrated in FIG. 1, like the linear motor 48. That is, in the case of the present embodiment, the lens barrel 10 is configured to be focused by the two focus lenses 46 and 58.

From here, the stroke ranges of the third frame 44 and the fourth frame 56 that respectively hold the focus lenses 46 and 58 will be described.

Figure 7A:
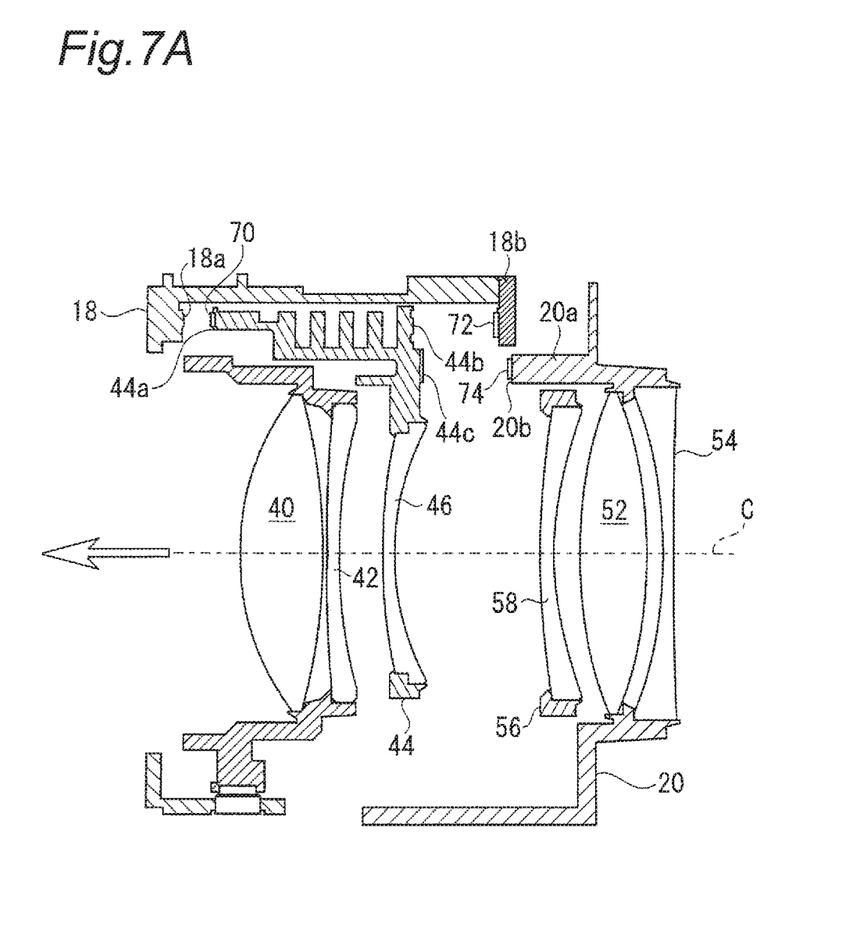
FIG. 7A is a schematic cross-sectional view of a part of the lens barrel in a state in which during telephoto shooting, a shooting distance is infinite.
Figure 7B:
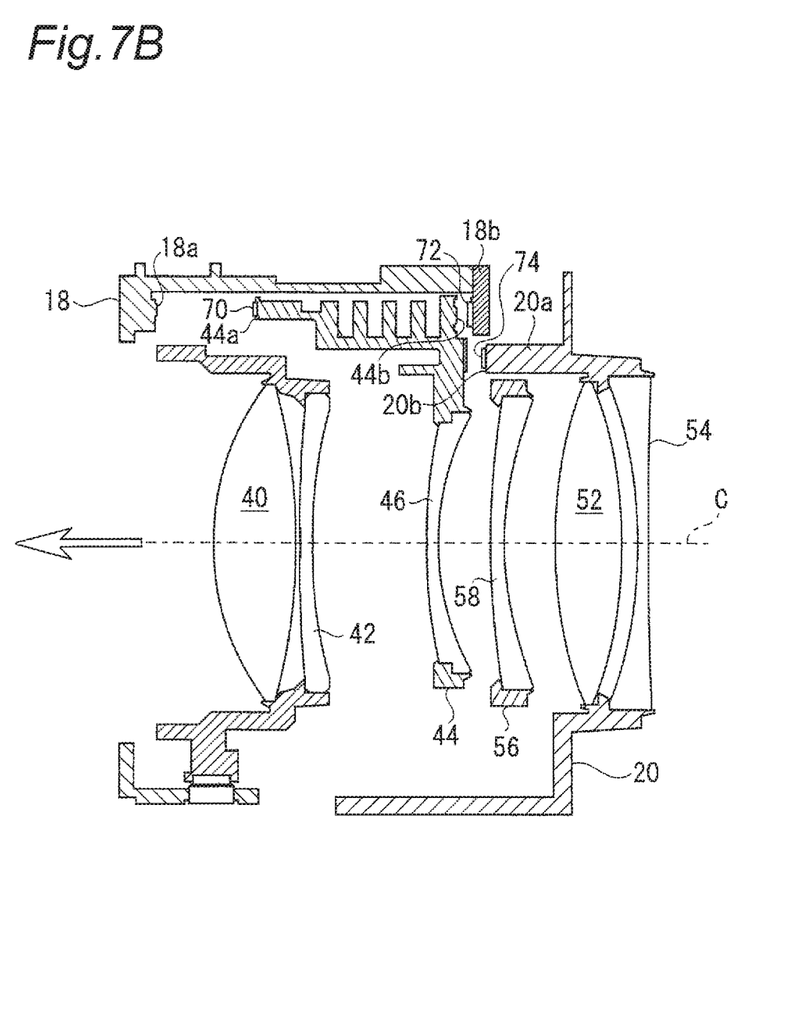
FIG. 7B is a schematic cross-sectional view of a part of the lens barrel in a state in which during telephoto shooting, a shooting distance is the minimum object distance.
Figure 7C:
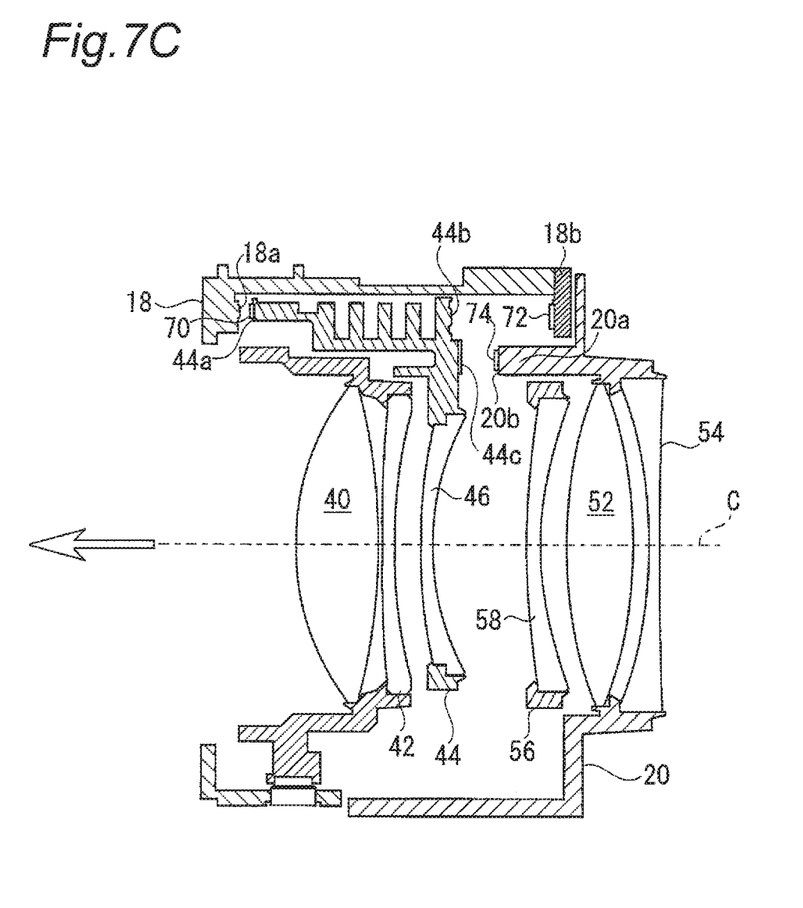
FIG. 7C is a schematic cross-sectional view of a part of the lens barrel in a state in which during wide-angle shooting, a shooting distance is infinite.
Figure 7D:
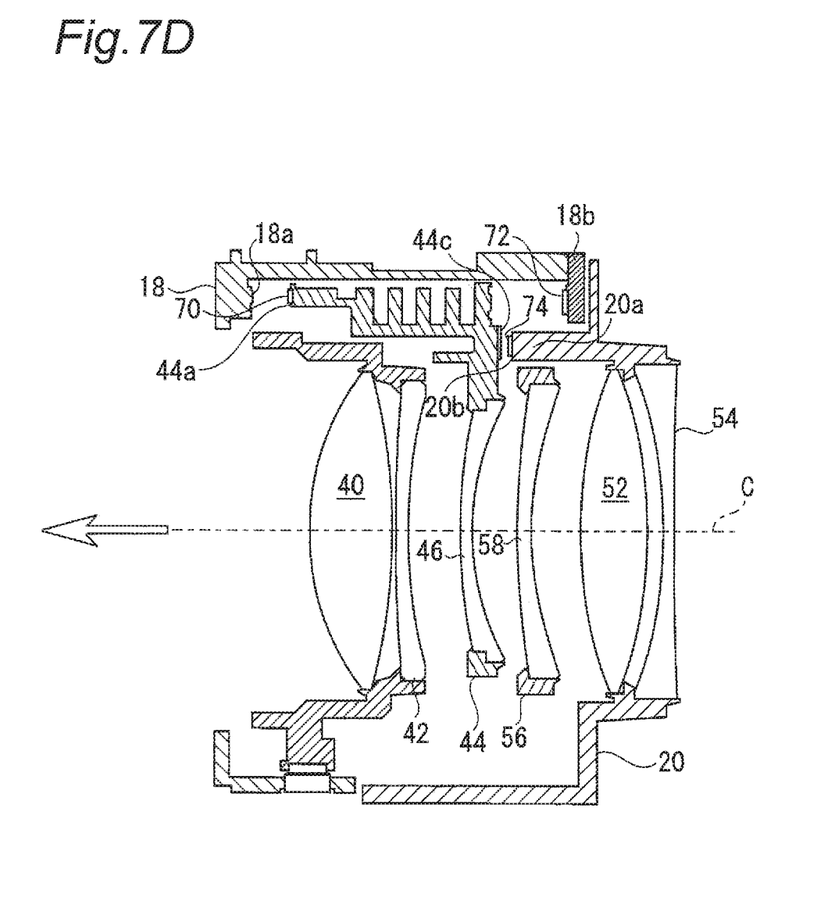
FIG. 7D is a schematic cross-sectional view of a part of the lens barrel in a state in which during wide-angle shooting, a shooting distance is the minimum object distance.

FIG. 7A is a schematic cross-sectional view of a part of the lens barrel in a state in which during telephoto shooting, a shooting distance is infinite. FIG. 7B is a cross-sectional view of a part of the lens barrel in a state in which during telephoto shooting, a shooting distance is the minimum object distance (MOD). Further, FIG. 7C is a schematic cross-sectional view of a part of the lens barrel in a state in which during wide-angle shooting, a shooting distance is infinite. FIG. 7D is a schematic cross-sectional view of a part of the lens barrel in a state in which during wide-angle shooting, a shooting distance is MOD.

As illustrated in FIGS. 7A and 7B, the stroke ranges of the third frame 44 holding the focus lens 46 and the fourth frame 56 holding the focus lens 58 are determined such that the third frame 44 and the fourth frame 56 do not come into contact with each other.

In the case of the present embodiment, the fourth frame 56 holding the focus lens 58 is connected to the stepping motor 60 to be driven. Therefore, when power supply to the stepping motor 60 is stopped, the fourth frame 56 is fixed at the position at that time. On the other hand, the third frame 44 holding the focus lens 46 is driven by the linear motor 48. A mover 48A of the linear motor 48 is attached to the third frame 44. Therefore, when power supply to the linear motor 48 is stopped, the third frame 44 is brought to the state of being freely movable. As a result, when the lens barrel 10 is tilted, the third frame 44 moves freely therein.

The stroke range of the third frame 44 is determined such that even if the third frame 44 moves freely in this way, the focus lens 46 held by the third frame 44 does not collide with the focus lens 58 of the fourth frame 56 and the lens 42 of the first frame 18, which are adjacent in the extending direction of the optical axis C of the lens barrel 10 (X-axis direction).

The cross-sectional view of FIG. 7A illustrates the positions of the third frame 44 and the fourth frame 56 in a state in which during telephoto shooting, a shooting distance is infinite. That is, FIG. 7A is a cross-sectional view in a state in which the first frame 18 and the second frame 20 are most distant from each other as illustrated in FIG. 3A. FIG. 7A also illustrates the third frame 44 and the fourth frame 56 in a state in which their positions are fixed because the linear motor 48 that drives the third frame 44 and the stepping motor 60 that drives the fourth frame 56 are being powered.

When the power supply to the linear motor 48 is stopped in the state illustrated in FIG. 7A, the third frame 44 is brought to the state of being freely movable in the extending direction of the optical axis C of the lens barrel 10 (X-axis direction).

A first stopper portion 18a is provided in the first frame 18, the first stopper portion 18a limiting, when the third frame 44 freely moves toward the one end 10a of the lens barrel 10 (toward the left side of the view), further movement of the third frame 44 toward the one end 10a by coming into contact with the third frame 44. With an end portion 44a close to the one end 10a of the third frame 44 in contact with the first stopper portion 18a of the first frame 18, the focus lens 46 held by the third frame 44 does not come into contact with the lens 42 held by the first frame 18. Herein, a shock absorbing member 70 for absorbing collision impact to reduce contact sound, such as rubber or sponge, is provided on either the first stopper portion 18a of the first frame 18 or the end portion 44a of the third frame 44.

On the other hand, a second stopper portion 18b is provided in the first frame 18, the second stopper portion 18b limiting, when the third frame 44 freely moves toward the other end 10b of the lens barrel 10 (toward the right side of the view), further movement of the third frame 44 toward the other end 10b by coming into contact with the third frame 44. With an end portion 44b close to the other end 10b of the third frame 44 in contact with the second stopper portion 18b of the first frame 18, the focus lens 46 held by the third frame 44 does not come into contact with the focus lens 58 held by the fourth frame 56. Therefore, the fourth frame 56 is fixed at a position by the stepping motor 60, where when the third frame 44 is brought to the state in contact with the second stopper portion 18b, the focus lens 46 of the third frame 44 does not come into contact with the focus lens 58. Also, an impact absorbing member 72 is provided on either the second stopper portion 18b of the first frame 18 or the end portion 44b of the third frame 44.

The cross-sectional view of FIG. 7B illustrates the positions of the third frame 44 and the fourth frame 56 in a state in which during telephoto shooting, a shooting distance is MOD. That is, FIG. 7B is a cross-sectional view in a state in which the first frame 18 and the second frame 20 are most distant from each other as illustrated in FIG. 3A. Also, FIG. 7B illustrates the third frame 44 and the fourth frame 56 in a state in which their positions are fixed because the linear motor 48 that drives the third frame 44 and the stepping motor 60 that drives the fourth frame 56 are being powered.

When the power supply to the linear motor 48 is stopped in the state illustrated in FIG. 7B, the third frame 44 is brought to the state of being freely movable in the extending direction of the optical axis C of the lens barrel 10 (X-axis direction).

When the third frame 44 freely moves toward the one end 10a of the lens barrel 10 (toward the left side of the view), the end portion 44a of the third frame 44 comes into contact with the first stopper portion 18a provided in the first frame 18. Thereby, the focus lens 46 held by the third frame 44 does not come into contact with the lens 42 held by the first frame 18.

On the other hand, when the third frame 44 freely moves toward the other end 10b of the lens barrel 10 (toward the right side of the view), the end portion 44b of the third frame 44 comes into contact with the second stopper portion 18b provided in the first frame 18. Thereby, the focus lens 46 held by the third frame 44 does not come into contact with the focus lens 58 held by the fourth frame 56. The fourth frame 56 is fixed at a position by the stepping motor 60, where when the third frame 44 is brought to the state in contact with the second stopper portion 18b, the focus lens 46 of the third frame 44 does not come into contact with the focus lens 58.

The cross-sectional view of FIG. 7C illustrates the positions of the third frame 44 and the fourth frame 56 in a state in which during wide-angle shooting, a shooting distance is infinite. That is, FIG. 7C is a cross-sectional view in a state in which the first frame 18 and the second frame 20 are closest to each other as illustrated in FIG. 3B. FIG. 7C also illustrates the third frame 44 and the fourth frame 56 in a state in which their positions are fixed because the linear motor 48 that drives the third frame 44 and the stepping motor 60 that drives the fourth frame 56 are being powered.

When the power supply to the linear motor 48 is stopped in the state illustrated in FIG. 7C, the third frame 44 is brought to the state of being freely movable in the extending direction of the optical axis C of the lens barrel 10 (X-axis direction).

When the third frame 44 freely moves toward the one end 10a of the lens barrel 10 (toward the left side of the view), the end portion 44a of the third frame 44 comes into contact with the first stopper portion 18a provided in the first frame 18. Thereby, the focus lens 46 held by the third frame 44 does not come into contact with the lens 42 held by the first frame 18.

On the other hand, when the third frame 44 freely moves toward the other end 10b of the lens barrel 10 (toward the right side of the view), the end portion 44b of the third frame 44 cannot come into contact with the second stopper portion 18b provided in the first frame 18. Before the third frame 44 comes into contact with the second stopper portion 18b, the focus lens 46 held by the third frame 44 comes into contact with the focus lens 58 held by the fourth frame 56. This is because when the first frame 18 and the second frame 20 are closest to each other, the fourth frame 56 is located close to the one end 10a of the lens barrel 10 with respect to the second stopper portion 18b.

A third stopper portion 20a is provided in the second frame 20, not in the first frame 18, so that in the state illustrated in FIG. 7C, the focus lens 46 of the third frame 44 that moves toward the other end 10b of the lens barrel 10 (toward the right side of the view) does not come into contact with the focus lens 58 of the fourth frame 56.

The third stopper portion 20a is provided in the second frame 20 such that when the second frame 20 is located within the range on the optical axis C of the lens barrel 10 where the third frame 44 is movable, for example, when the first frame 18 and the second frame 20 are in a state in which they are closest to each other as illustrated in FIG. 7C (FIG. 3B), a contact surface 20b at the tip of the third stopper portion 20a is located close to the one end 10a of the lens barrel 10 with respect to the second stopper portion 18b of the first frame 18. The contact surface 20b of the third stopper portion 20a is also located close to the one end 10a with respect to the focus lens 58 held by the fourth frame 56 located closest to the one end 10a (see FIGS. 7B and 7D). That is, the fourth frame 56 is mounted on the second frame 20 so as to stroke on the side of the other end 10b of the lens barrel 10 with respect to the contact surface 20b of the third stopper portion 20a.

Therefore, when the third frame 44 freely moves toward the other end 10b of the lens barrel 10 (toward the right side of the view), an end portion 44c of the third frame 44 comes into contact with the contact surface 20b of the third stopper portion 20a provided in the second frame 20. Thereby, the focus lens 46 held by the third frame 44 does not come into contact with the focus lens 58 held by the fourth frame 56. An impact absorbing member 74 is provided on either the contact surface 20b of the third stopper portion 20a of the second frame 20 or the end portion 44c of the third frame 44.

If the third stopper portion 20a of the second frame 20 is not present, the first frame 18 has a limitation on approach to the second frame 20. Therefore, it is necessary for the first frame 18 to ensure a necessary stroke at a position away from the second frame 20, so that a large space is ensured in the lens barrel 10 because of the first frame 18 and the second frame 20. As a result, when downsizing of the lens barrel is demanded, it is difficult to arrange another frame or the stroke for another frame is limited. That is, it becomes difficult to design the layout of optical members in the lens barrel, such as lenses and aperture units, so that the degree of freedom in designing the lens barrel decreases.

On the other hand, in the case of the present embodiment, the first frame 18 can approach the second frame 20 because of the third stopper portion 20a provided in the second frame 20, to an extent in which most of the first frame 18 overlaps the second frame 20 in the directions (Y-axis direction and Z-axis direction) perpendicular to the optical axis C of the lens barrel 10, as illustrated in FIGS. 7C and 7D. As a result, the space ensured for the first frame 18 and the second frame 20 becomes smaller than when the third stopper portion 20a is not present. Thereby, even if downsizing of the lens barrel is demanded, it is possible to easily arrange another frame and to freely set its stroke. That is, designing the layout of optical members in the lens barrel, such as lenses and aperture units, becomes easy, and the degree of freedom in designing the lens barrel is improved.

The cross-sectional view of FIG. 7D illustrates the positions of the third frame 44 and the fourth frame 56 in a state in which during wide-angle shooting, a shooting distance is infinite. That is, FIG. 7D is a cross-sectional view in a state in which the first frame 18 and the second frame 20 are closest to each other as illustrated in FIG. 3B. FIG. 7D also illustrates the third frame 44 and the fourth frame 56 in a state in which their positions are fixed because the linear motor 48 that drives the third frame 44 and the stepping motor 60 that drives the fourth frame 56 are being powered.

When the power supply to the linear motor 48 is stopped in the state illustrated in FIG. 7D, the third frame 44 is brought to the state of being freely movable in the extending direction of the optical axis C of the lens barrel 10 (X-axis direction).

When the third frame 44 freely moves toward the one end 10a of the lens barrel 10 (toward the left side of the view), the end portion 44a of the third frame 44 comes into contact with the first stopper portion 18a provided in the first frame 18. Thereby, the focus lens 46 held by the third frame 44 does not come into contact with the lens 42 held by the first frame 18.

On the other hand, when the third frame 44 freely moves toward the other end 10b of the lens barrel 10 (toward the right side of the view), the end portion 44c of the third frame 44 comes into contact with the third stopper portion 20a provided in the second frame 20. Thereby, the focus lens 46 held by the third frame 44 does not come into contact with the focus lens 58 held by the fourth frame 56. The fourth frame 56 is fixed at a position by the stepping motor 60, where when the third frame 44 is brought to the state in contact with the third stopper portion 20a, the focus lens 46 of the third frame 44 does not come into contact with the focus lens 58.

According to the present embodiment as described above, the degree of freedom in designing the lens barrel can be ensured even if the lens barrel is downsized.

The lens barrel according to the present disclosure has been described above with reference to the above embodiment. However, the present disclosure is not limited to the above embodiment.

In the case of the above embodiment, the second frame 20 is provided to be movable, for example, in the extending direction of the optical axis C of the lens barrel 10 (X-axis direction). Instead, the second frame 20 may be fixed to the lens barrel 10. That is, the first frame 18 is provided in the lens barrel 10 so as to be movable, so that the second frame 20 can be moved relative to the first frame 18.

In the case of the above embodiment, the third frame 44 is driven by the linear motor 48. Therefore, when the power supply to the linear motor 48 is stopped, the third frame 44 is brought to the state of being freely movable. The first to third stopper portions 18a, 18b, and 20a are provided such that the focus lens 46 held by the third frame 44 that moves freely does not collide with the other adjacent lenses 42 and 58. However, the device for driving the third frame 44 is not limited to the linear motor 48. The third frame 44 may be driven by, for example, a stepping motor. When connected to a stepping motor, the third frame 44 usually cannot move freely. However, the third frame 44 can be brought to the state of being freely movable due to a failure of the stepping motor, breakage of a connecting portion between the stepping motor and the third frame 44, or the like. In that case, the first to third stopper portions 18a, 18b, and 20a play its role.

In connection with this, the device for driving the fourth frame 56 may be a linear motor, instead of the stepping motor 60.

Further, in the case of the above embodiment, the fourth frame 56 is mounted on the second frame 20 so as to be movable in the extending direction of the optical axis C of the lens barrel 10 (X-axis direction). However, embodiments of the present disclosure are not limited thereto. For example, the fourth frame may be fixed to the second frame. Further, the fourth frame can be omitted with the second frame holding the optical members held by the fourth frame.

Furthermore, in the case of the above embodiment, the second frame 20 is arranged close to the other end 10b of the lens barrel 10, that is, close to the image plane with respect to the first frame 18. Alternatively, the second frame 20 may be arranged close to the one end 10a of the lens barrel 10, that is, close to a subject with respect to the first frame 18. That is, in this case, positions and orientations of components such as the first to fourth frames in the lens barrel is reversed in the optical axis direction of the lens barrel.

In addition, in the case of the above embodiment, the first to fourth frames 18, 20, 44, and 56 hold lenses as the optical members. However, embodiments of the present disclosure are not limited thereto. Any one of the first to fourth frames may hold an aperture unit, an ND filter, etc., as the optical members instead of the lenses.

As described above, a plurality of embodiments have been described as examples of the technology in the present disclosure. For this purpose, the accompanying drawings and detailed description have been provided.

Accordingly, the components described in the accompanying drawings and the detailed description can include not only the components essential for solving the problems but also the components not essential for solving the problems, in order to show the technology as an example. Therefore, those non-essential components should not be immediately recognized as being essential as they are described in the accompanying drawings and detailed description.

Also, the above embodiment is to show as example the technology in the present disclosure, and hence various changes, replacements, additions, omissions, etc. can be made within the scopes of the claims or their equivalents.

The present disclosure can be applied to a lens barrel that includes a plurality of optical members, some of which can move in the extending direction of an optical axis.

What is claimed is:

1. A lens barrel having one end and another end in an optical axis direction of the lens barrel, the lens barrel comprising:
   a first frame that is movable in the optical axis direction of the lens barrel, and holds an optical member;
   a second frame that is arranged to be relatively movable in the optical axis direction toward the other end with respect to the first frame, and holds an optical member; and
   a third frame that is directly mounted on the first frame so as to be movable relative to the first frame in the optical axis direction, and holds an optical member, wherein
   the first frame and the second frame are located towards the one end and the other end of the lens barrel, respectively, and are movable in the optical axis direction relative to one another between a position where the first frame is most distant from the second frame, and a position where the first frame is closest to the second frame,
   the first frame includes a first stopper portion that is fixed on the first frame and that comes into contact with the third frame to limit movement of the third frame toward the one end relative to the first frame, both in a case where the first frame is most distant from the second frame and a case where the first frame is closest to the second frame,
   the first frame includes a second stopper portion that is fixed on the first frame and that comes into contact with the third frame to limit movement of the third frame toward the other end relative to the first frame in the case where the first frame is most distant from the second frame, and
   the second frame includes a third stopper portion that is fixed on the second frame and has a contact surface that comes into contact with the third frame to limit movement of the third frame toward the other end relative to the second frame, rather than movement of the third frame being limited by the second stopper portion, in the case where the first frame is closest to the second frame, wherein the contact surface is located closer in the optical axis direction to the one end than the second stopper portion when the second frame is located within a range on the optical axis where the third frame is movable.

2. The lens barrel according to claim 1, further comprising a linear motor that is mounted on the first frame to drive the third frame in the optical axis direction.

3. The lens barrel according to claim 1, wherein the optical member held by the third frame is a focus lens.

4. The lens barrel according to claim 1, further comprising a fourth frame that is mounted on the second frame so as to be movable in the optical axis direction, and holds an optical member, wherein the fourth frame is mounted on the second frame so as to stroke on the side of the other end with respect to the contact surface of the third stopper portion.

5. The lens barrel according to claim 4, wherein the optical member held by the fourth frame is a focus lens.

6. The lens barrel according to claim 1, wherein the second frame is movable in the optical axis direction.

7. A camera comprising the lens barrel according to claim 1.

* * * * *